United States Patent
MacLean et al.

(10) Patent No.: US 9,061,623 B2
(45) Date of Patent: Jun. 23, 2015

(54) SEALABLE TRANSPORT TRAILER CONTAINER WITH HINGING BAFFLES

(71) Applicant: Oculus Transport Ltd., Fort St. John (CA)

(72) Inventors: Michael MacLean, Fort St. John (CA); Henry James Klassen, Fort St. John (CA)

(73) Assignee: OCULUS TRANSPORT LTD., Fort St. John, BC (CA)

( * ) Notice: Subject to any disclaimer, the term of this patent is extended or adjusted under 35 U.S.C. 154(b) by 0 days.

(21) Appl. No.: 14/294,355

(22) Filed: Jun. 3, 2014

(65) Prior Publication Data
US 2014/0353308 A1    Dec. 4, 2014

Related U.S. Application Data

(60) Provisional application No. 61/830,421, filed on Jun. 3, 2013.

(51) Int. Cl.
*B65D 88/12* (2006.01)
*B60P 3/22* (2006.01)

(52) U.S. Cl.
CPC .................................. *B60P 3/2235* (2013.01)

(58) Field of Classification Search
CPC ...................... B60P 3/2235; B60K 2015/0344
See application file for complete search history.

(56) References Cited

U.S. PATENT DOCUMENTS

| 2,552,119 | A | 5/1951 | Scharenberg |
| 3,905,308 | A | 9/1975 | Laudato, Jr. |
| 4,136,973 | A | 1/1979 | Van Der Lely |
| 4,251,005 | A | 2/1981 | Sons et al. |
| 4,331,342 | A | 5/1982 | Van Der Lely |
| 4,389,314 | A | 6/1983 | Petretti |
| 4,775,070 | A | 10/1988 | Williams |
| 6,547,091 | B2 | 4/2003 | Hagenbuch |
| 7,735,507 | B2 * | 6/2010 | Hagenbuch .................. 220/563 |

* cited by examiner

*Primary Examiner* — Kevin Hurley
(74) *Attorney, Agent, or Firm* — Heslin Rothenberg Farley & Mesiti P.C.; Victor A. Cardona, Esq.

(57) ABSTRACT

A container for use on a dump truck style transport trailer is described, and specifically a container for transporting a fluid mixture such as a slurry or sludge is described. The container has interior hinging baffles for dividing the container into compartments and preventing the contents in the container from moving around during transport. The container has a tailgate that is connected to the baffles such that pivoting the tailgate causes the baffles to pivot. The container also includes a sealable lid that can be opened for loading contents into the container and closed for preventing spillage of the contents during transportation. A cleaning system and heating system for the container are also described.

13 Claims, 9 Drawing Sheets

FIG. 10

SEALABLE TRANSPORT TRAILER CONTAINER WITH HINGING BAFFLES

CROSS REFERENCE TO RELATED APPLICATIONS

This application claims priority from U.S. Provisional Application No. 61/830,421 filed on Jun. 3, 2014, the entire disclosure of which is incorporated herein by reference.

FIELD OF THE INVENTION

The invention relates to a container for use on a transport trailer for the transportation of a fluid mixture such as a slurry. The transport trailer has a sealable lid and hinging baffles to facilitate the loading, unloading and transport of fluid mixtures where containment and preventing movement of the fluid mixture during transport are important.

BACKGROUND OF THE INVENTION

Two commonly used motor vehicles for transporting loads on roadways are tractor trailers and tank trucks or "tankers". Tractor trailers typically comprise a towing vehicle, commonly referred to as the tractor or the truck, and one or more semi-trailers for carrying cargo. The semi-trailer is attached to the tractor at a point just forward of the rear-most axle of the tractor such that a fraction of the weight of the trailer is carried by the tractor.

Tankers are primarily used to carry various liquid or semi-liquid cargoes. A tanker typically comprises a sealed cylindrical tank lying horizontally on a truck bed and often includes an integral pumping system for pumping material in and out of the tank. Large tankers can have a capacity ranging from 21,000 to 44,000 L (5,500 to 11,600 US gallons), while small tankers have a capacity less than 11,000 L (3,000 US gallons). Tankers may include additional features such as insulation, pressurization, and/or compartmentalization, depending on the cargoes being carried. Due to the cylindrical shape, a tanker has a high center of gravity which makes them more difficult to drive than a tractor trailer.

For transporting various fluid materials, including mixtures of liquids and solids like a sludge or slurry, both tractor trailers and tankers can be used. A vacuum tanker is a specific type of tanker that is typically used for transporting sludge and slurries such as drilling muds, drill cuttings and cement from oil and gas well sites, as well as sewage and waste from cleaning streets, sewers, septic tanks and grease bins. A vacuum tanker uses a heavy duty vacuum system for pneumatically loading and unloading material into and out of the tank through suction lines. While vacuum tankers can be effective for transporting slurries/sludge, they are generally more expensive than tractor trailers and the inside of the tank can be difficult to access for cleaning and maintenance purposes. As such, dump truck tractor trailers having a container on the trailer are often used for transporting a sludge/slurry.

Using a dump truck tractor trailer allows a sludge/slurry in the container to be quickly and easily unloaded, as one side or end of the container can lift up and a gate opens on the opposite side or end to allow the sludge/slurry to flow out of the container through the gate. Using an open top container dump truck allows a sludge/slurry to easily be loaded into the container using an auger and allows easy access to the container for cleaning and maintenance purposes. However, the sludge/slurry can slosh around in the container and spill over the sides of the container during transport. Using a closed container can help keep the sludge/slurry in the container, however it makes it more difficult to load and clean the container. Furthermore, the sludge/slurry can still slosh around in the container during transport, making it difficult for the driver to handle the truck under various driving conditions. The slurry/sludge may also accumulate at one end of the truck when the driver accelerates or decelerates, or when the truck is driving up or down a hill. This is especially problematic driving uphill, as the slurry/sludge may amass at the rear end of the container, moving the center of load to the rear of the trailer and removing the load from the truck drive axles that are located near the front of the trailer, causing the truck to be unable to drive up the hill. This is especially problematic at oil and gas sites where steep hills and rough roads are often encountered.

To solve the problem of a slurry/sludge sloshing around and/or accumulating at one end of the container, the slurry/sludge may be mixed with another material for stabilization. At oil and gas sites, sawdust is often mixed with a slurry of drill cuttings to stabilize the drill cuttings for transport. However this results in increased costs and time due to additional steps, additional materials, additional labor, and an increased volume of material to transport. Furthermore, if the slurry is to be transported to a site for separation and recovery of the slurry components the addition of a further component complicates the separation process and creates further waste material.

Tankers and containers may be insulated to help prevent the contents from freezing in cold temperatures, which makes it difficult to unload the contents from the tank/container. A drawback with insulation is that it adds extra bulk and weight to the tank/container, which can reduce the volume and weight of material that can be transported in a load. While the insulation may be useful when temperatures are near or below freezing, tanks/containers are often used in locations with seasonal variation, and the insulation adds unnecessary weight/bulk during the warmer months Accordingly, there is a need for an economical transport trailer having a container for transporting a sludge/slurry that is easy to unload and unload, and wherein the sludge/slurry is stabilized in the container without adding further materials to the sludge/slurry. There is also a need for a transport trailer container that can be cleaned easily and that prevents the contents from freezing in cold temperatures A review of the prior art reveals several patents related to various style transport trucks and tankers.

U.S. Pat. No. 4,389,314 to Petretti teaches a flush tank end-dump style eductor truck adapted to siphon debris from a sewer/catch basin. The truck includes a settling tank having a series of vertical hinged internal baffles dividing the tank into sections and a hinged rear door. When a mixture of debris and liquid is siphoned into the rear-most section of the settling tank, the heavier debris falls to the floor and the fluid is distributed through all the settling tank sections by flowing through large openings in the internal baffles. The baffle near the front end of the tank includes small openings to strain out the fine debris from the fluid as it flows into the front-end compartment. This strained fluid can then by re-used to further flush out the sewer/catch basin. When the settling tank is to be emptied, the tank is pivoted upwardly by a hydraulic cylinder and the rear door and internal baffles swing open around upper pivots to permit debris to be cleaned out. The rear door contains a hydraulically-activated latch mechanism to prevent the door from opening until the tank is in a full upward tilt position.

U.S. Pat. No. 4,136,973 to van der Lely teaches a cylindrical transport tank for transporting a mixture of manure and water having guide members to produce recirculating and swirling motions of the mixture within the tank as the result of normal movements of the tank during transportation. A first guide member is inclined upwardly from the rear of the tank to the front of the tank, curving downwards at the front, to cause the mixture to surge forward up the guide member during stopping motions. A second guide member extends from the top of the tank downwardly at an inclination opposite the first guide member to prevent the mixture from sloshing backwards to the rear of the tank after it has surged forward. The rearmost portion of the first guide member is hinged, thereby allowing the returning mixture to rotate this portion of the first guide upwardly and flow toward a rear discharge valve.

U.S. Pat. No. 6,547,091 to Hagenbuch teaches a water tanker having internal baffles for preventing surging of the water during transportation. The internal baffles are configured to allow maintenance access between compartments defined by the baffles Specifically, there are lateral baffle doors along the interior sides of the tanker that open and close like a door from a lateral direction to a longitudinal direction, such that when all the doors are in an open longitudinal direction, workers have unobstructed access to the side sections of the tanker from the front end to the rear end.

U.S. Pat. No. 4,775,070 to Williams teaches an internal baffle system for a tank to prevent fluid surges. Specifically, the interior of the tank is divided into upper and lower compartments by a plurality of upper stationary vertical baffles extending downward from the top interior wall of the tank to a middle point within the tank, and a plurality of lower stationary vertical baffles extending upward from the bottom interior floor of the tank to the middle point. A rotatable member is positioned in the middle of the tank between the upper and lower baffles and is moveable between an open and closed position to either allow or block fluid from flowing between the upper and lower compartment.

U.S. Pat. No. 4,251,005 to Sons et al teaches a tank for transporting liquids having a baffle system to control liquid surges. The baffle system includes large longitudinal cylindrical hollow baffles extending the length of the tank and transverse support partitions extending between the side walls of the tank.

U.S. Pat. No. 2,552,119 to Scharenberg teaches a collapsible fuel tank for an aircraft having "cross elements" or baffles positioned transversely in the interior of the tank and spaced apart longitudinally from the front to the rear of the tank to provide internal support. The baffles are generally circular in shape and have a vertically positioned hinge in the middle of the baffle to allow the baffle to fold in half when the fuel tank is collapsed.

U.S. Pat. No. 3,905,308 to Laudato, Jr. teaches a railway car having a built-in swimming pool containing moveable vertical hinged, baffles that operate automatically to contain the water when the train accelerates, decelerates or stops. The baffles are hinged to a side wall of the train, and lie relatively flat against the wall in the retracted position. The baffles are actuated automatically when the braking system of the train is applied, swinging outwardly from the side wall to extend transversely towards the opposite side wall, extending across the pool to inhibit forward or rearward displacement of the water.

U.S. Pat. No. 4,331,342 to van der Lely teaches a tank wagon for liquid material having internal partitions with dampeners that divide the tank into compartments and counteract movement of the liquid material with respect to the tank in one direction only: from the rear to the front of the tank. The internal vertical partitions extend between the side walls of the tank, leaving an opening between the bottom edge of the partition and the tank floor. The bottom section of the partition has a flap that rests in an open position and allows fluid movement at the bottom of the tank when the tank is at a constant speed or accelerating. When the tank decelerates and fluid is thrust towards the front of the tank, the fluid pushes the flap into a closed position to limit fluid movement towards the front of the tank.

SUMMARY OF THE INVENTION

In accordance with the invention, there is provided a transport container for use on a dump truck style tractor trailer comprising a container having an interior surface, an open top and a pivotable tailgate located at a back end of the container that is operable between an open and closed position at least one interior baffle pivotably connected to the interior surface of the container, the at least one interior baffle pivotable between a substantially vertical closed position and an angled open position, wherein in the angled open position a bottom end of the at least one interior baffle is pivoted towards the tailgate; and a rod pivotably connected to the at least one interior baffle and to the tailgate for pivoting the at least one interior baffle and the tailgate substantially simultaneously between the open and closed positions.

In a further embodiment, the transport container comprises a lid pivotably connected to the open top of the container for covering and sealing the open top.

In another embodiment, there are at least two interior baffles and the at least two interior baffles are connected to each other via a second rod for pivoting, the at least two interior baffles substantially simultaneously.

In yet another embodiment, the transport container further comprises a tailgate locking device for locking the tailgate in the closed position, wherein locking the tailgate simultaneously locks the at least one baffle in the substantially vertical closed position.

In a further embodiment, the transport container is sealed when the tailgate is in the closed position.

In yet another embodiment, the transport container further comprises a cleaning system for cleaning the interior surface of the container. The cleaning system may comprise at least one jet operatively connected to the container.

In one embodiment, the transport container further comprises a heating system for heating the container.

In a further embodiment, when the baffle(s) is/are in the substantially vertical closed position there is a first void space between a bottom end of the baffle(s) and a bottom floor of the container.

In yet another embodiment the lid and tailgate are hydraulically activated.

BRIEF DESCRIPTION OF THE DRAWINGS

The invention is described with reference to the accompanying figures in which.

DETAILED DESCRIPTION OF THE INVENTION

With reference to the figures, a transport trailer 10 is described. The trailer is an end dump trailer comprising a container 12, a lid 20, a tailgate 30 and a first and second baffle 40, 42 connected to the tailgate via a rod 50. The trailer also generally includes a heating system and a cleaning system.

Figure 1:
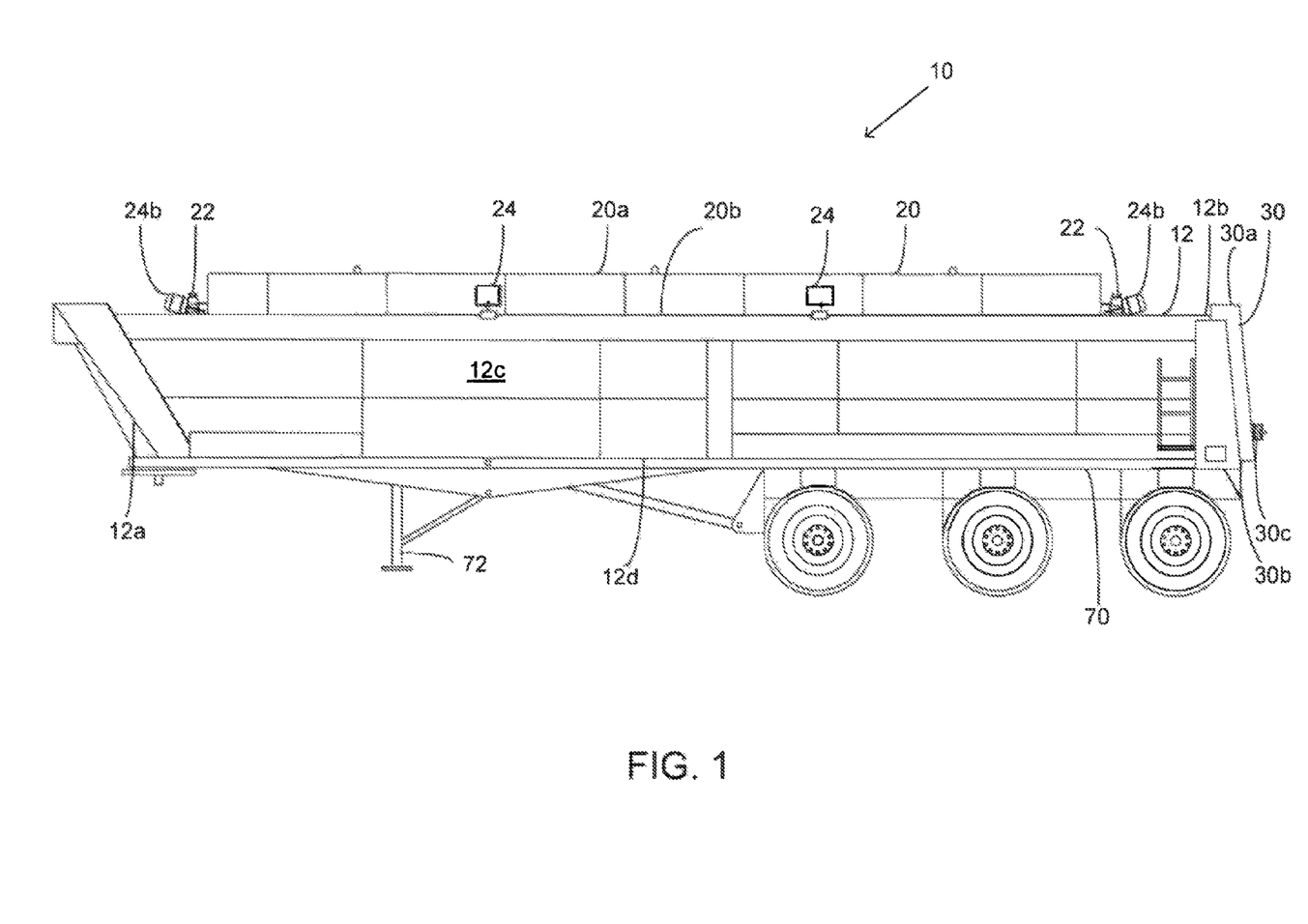
FIG. 1 is side view of a transport trailer in accordance with one embodiment of the invention.

Referring to FIG. 1, the container 12 includes a front end 12a, rear end 12b, two sidewalls 12c and a floor 12d. A hinge (not shown) operatively connects the rear end of the container to a trailer bed 70, and the container can pivot about the hinge such that the front end 12a lifts upward, as shown in FIG. 4B, using a hydraulic lifting ram 72.

The sidewalls of the container are generally vertical and parallel to one another. In the preferred embodiment, the container is approximately 13 meters long and 2.5 meters wide, creating an internal volume of approximately 28 m³. Preferably, the internal volume of the container is approximately 22 m³ to 28 m³, although various other sizes of a container could be used as would be known to one skilled in the art. The walls and floor of the container are preferably made of a strong durable material such as steel.

Figure 3:
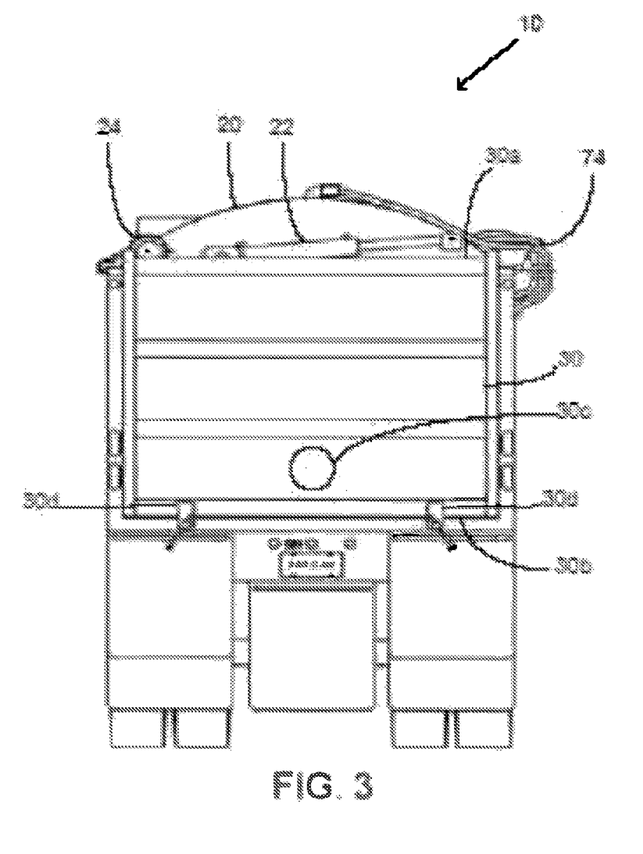
FIG. 3 is an end view of a transport trailer in accordance with one embodiment of the invention.
Figure 4A:
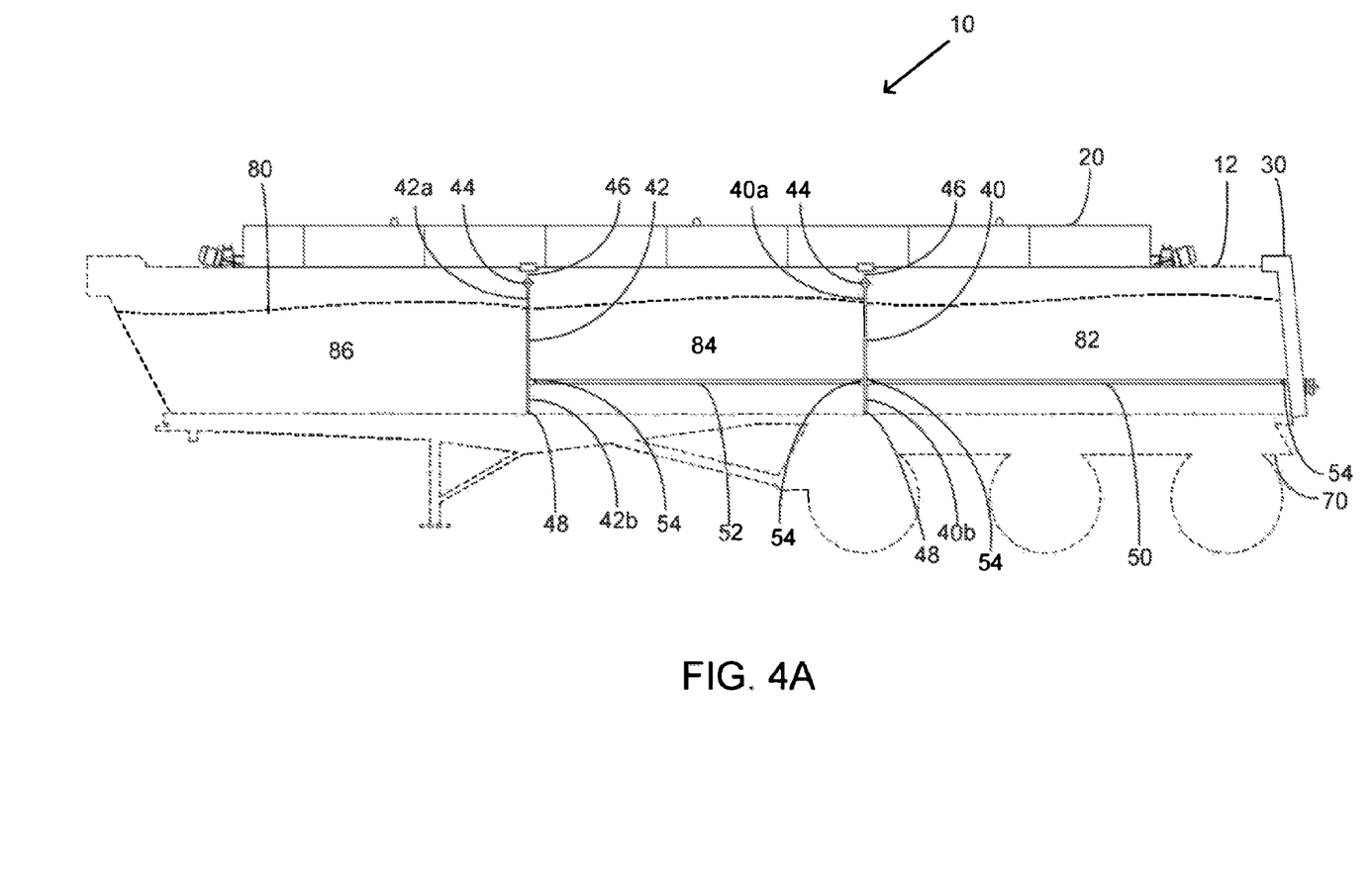
FIG. 4A is a sectional side view of a transport trailer in accordance with one embodiment of the invention.
Figure 4B:
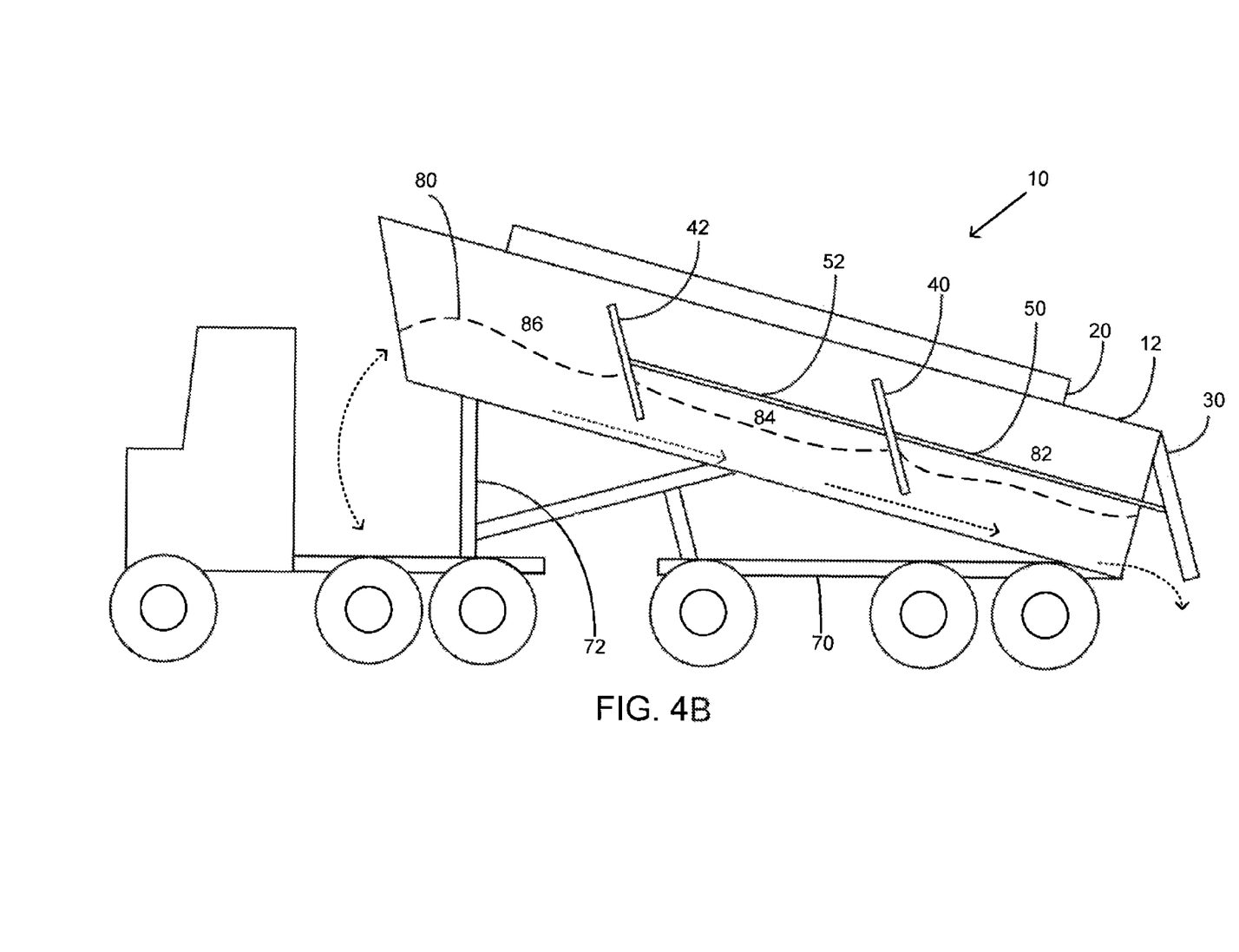
FIG. 4B is a sectional side view of a transport trailer in the dumping position in accordance with one embodiment of the invention.

Referring to FIGS. 1, 3 and 4A, the tailgate 30 has a top end 30a that is pivotably connected to the container rear end 12b via a tailgate hinge (not shown). A bottom end 30b of the tailgate swings outwardly to allow any contents 80 in, the container to flow out the rear end of the container, as shown in FIG. 4B. The tailgate includes seals (not shown) located between the inside surface of the tailgate and the container walls for creating a tight seal and preventing any contents from leaking out, of the container when the tailgate is closed. The pivoting of the tailgate is preferably controlled using a hydraulic ram (not shown). Tailgate locking mechanisms 30d lock the tailgate in a closed position The locking mechanisms may be automatically or manually controlled. The tailgate also includes a pressure release valve 30c that can be opened to equalize the pressure inside the container and outside the container.

Baffles

Referring to FIGS. 4A and 4B, the first and second baffle 40, 42 are generally vertical baffles that are parallel to one another and located inside of the container, extending between the sidewalls 12c to create a first compartment 82, second compartment 84, and third compartment 86. The baffles have a top end 40a, 42a and a bottom end 40b, 42b, wherein the top end is pivotably connected to the sidewalls via a hinge 44. Preferably, the top end does not extend completely to the lid 20 and the bottom end does not extend completely to the container floor 12d, leaving a small gap above 46 and below 48 the baffle for allowing any contents 80 in the container to slowly flow between the compartments to evenly distribute the contents between the containers. In one embodiment, the baffles include small holes to allow the contents to slowly flow between the compartments for even distribution.

The first baffle 40 is connected to the tailgate 30 via a first rod 50, and the second baffle 42 is connected to the first baffle via a second rod 52, The ends of the rods 50, 52 are connected to the baffles and tailgate with a hinge 54 or other pivot mechanism that pivots in a vertical plane. As the tailgate opens, the baffles simultaneously open and pivot about the hinge 44 as a result of being connected to the tailgate via the rods, causing the baffle movements to mirror the movement of the tailgate, as shown in FIG. 4B. As the baffles and tailgate pivot open, the compartments in the container are opened up such that the contents from all the compartments can flow out the end of the container. When the tailgate is closed and locked in place, the baffles are also locked in place in a vertical position, compartmentalizing the container into first, second and third compartments 82, 84, 86 to prevent or reduce movement of the contents in the container between compartments preventing the contents from accumulating at one end of the container. By locking the baffles in place in their vertical position during transportation, the contents are also prevent from surging between the front, and rear end of the container when the trailer decelerates and accelerates during transport.

Although the invention has been described as having two baffles, there may be any number of baffles to create any number of compartments. There may also be two or more parallel rods connecting the first baffle to the second baffle, and the tailgate to the first baffle in order to provide extra strength.

Container Lid

Figure 5:
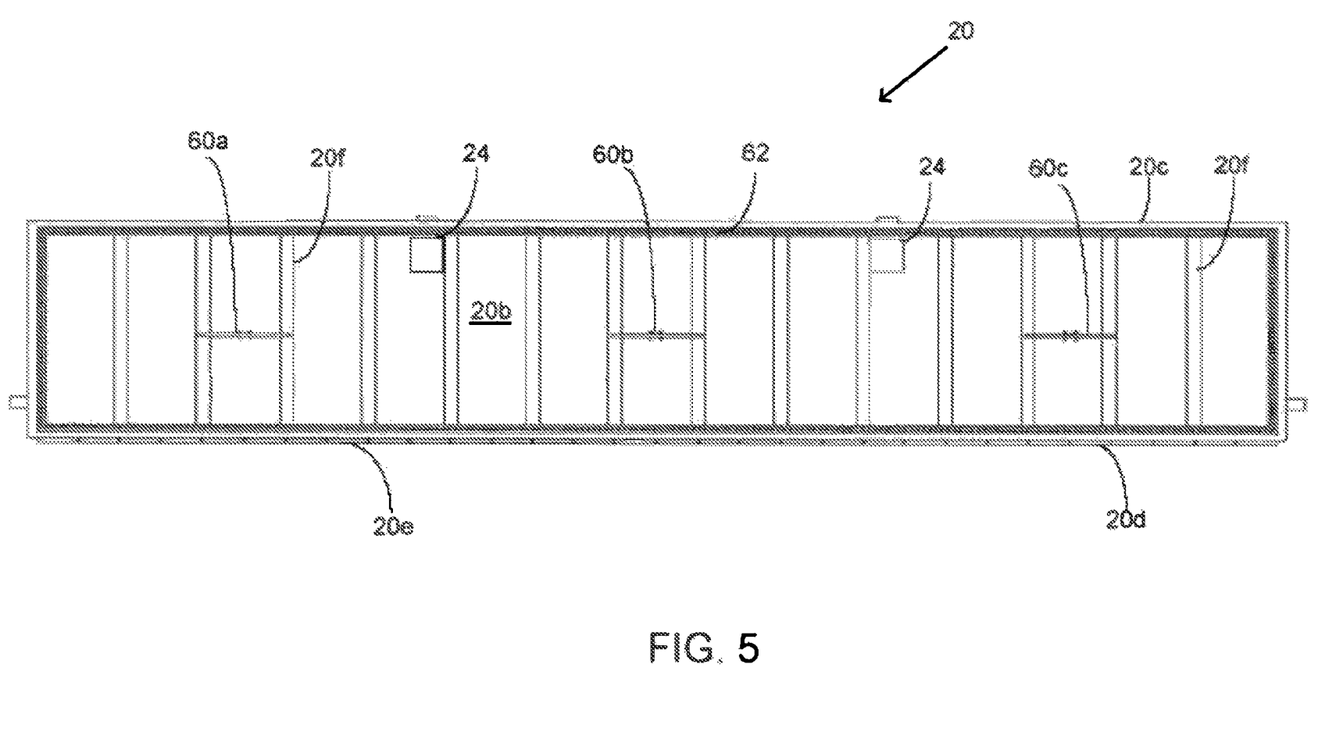
FIG. 5 is a bottom view of a transport trailer lid in accordance with one embodiment of the invention.

Referring to FIGS. 1-2 and 5-8, the lid 20 is a side-opening lid that includes a top surface 20a, bottom surface 20b and first and second side 20c, 20d. The top surface 20a of the lid is preferably arch-shaped, while the bottom surface 20b is generally flat. Referring to FIG. 5, a plurality of support members 20f extend between the first and second sidewalls to add structural support to the lid. In other embodiments, various shapes and support mechanisms for the lid are provided.

Figure 6:
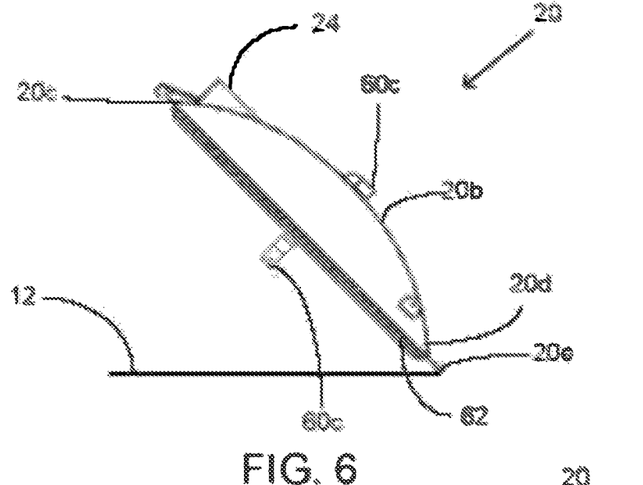
FIG. 6 is an end view of a transport trailer lid in an open position in accordance with one embodiment of the invention.
Figure 7:
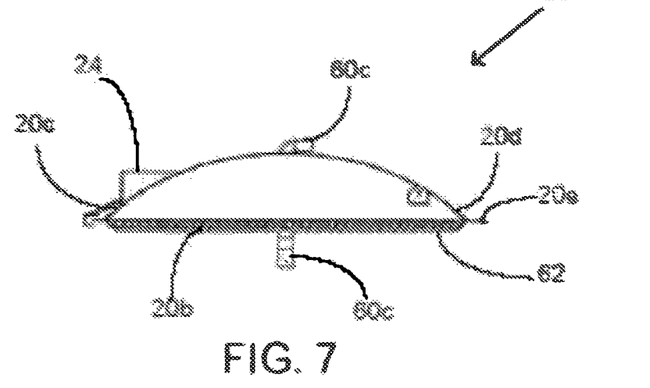
FIG. 7 is an end view of a transport trailer lid in a closed position in accordance with one embodiment of the invention.

The first side 20c of the lid is pivotably connected to the container sidewall 12c via a hinge 20e, which is preferably a "piano" style hinge, allowing the second side 20d of the lid to move upwardly from a closed position shown in FIG. 7 to an open position, shown in FIG. 6. The lid includes a lifting ram 22, preferably a hydraulic lifting ram, for opening and closing the lid. The lid also includes locking mechanism 24 for locking the lid in the closed position. The locking mechanisms are preferably hydraulically operated using locking rams 24b. A seal (not shown) located between the lid bottom surface 20b and the container walls creates a tight seal when the lid is closed to prevent any contents from leaking or spilling out of the container during transport. In other embodiments, various styles of opening, lifting and locking mechanisms are provided.

Heating System

The heating system is used to prevent the contents in the container from freezing during cold temperatures, Referring to FIG. 5, the heating system generally comprises a hose 62 operatively connected to the perimeter of the lid bottom surface 20b, Warmed air or fluid can be circulated through the hose to warm the container and its contents. The fluid circulation can be turned on and off in order to circulate the warmed fluid only when necessary. In one embodiment the heat from the exhaust from the truck is captured and circulated in the hose. In another embodiment, an electrical system (not shown) is used to warm a fluid such as glycol that is then circulated through the hose.

Cleaning System

Figure 2:
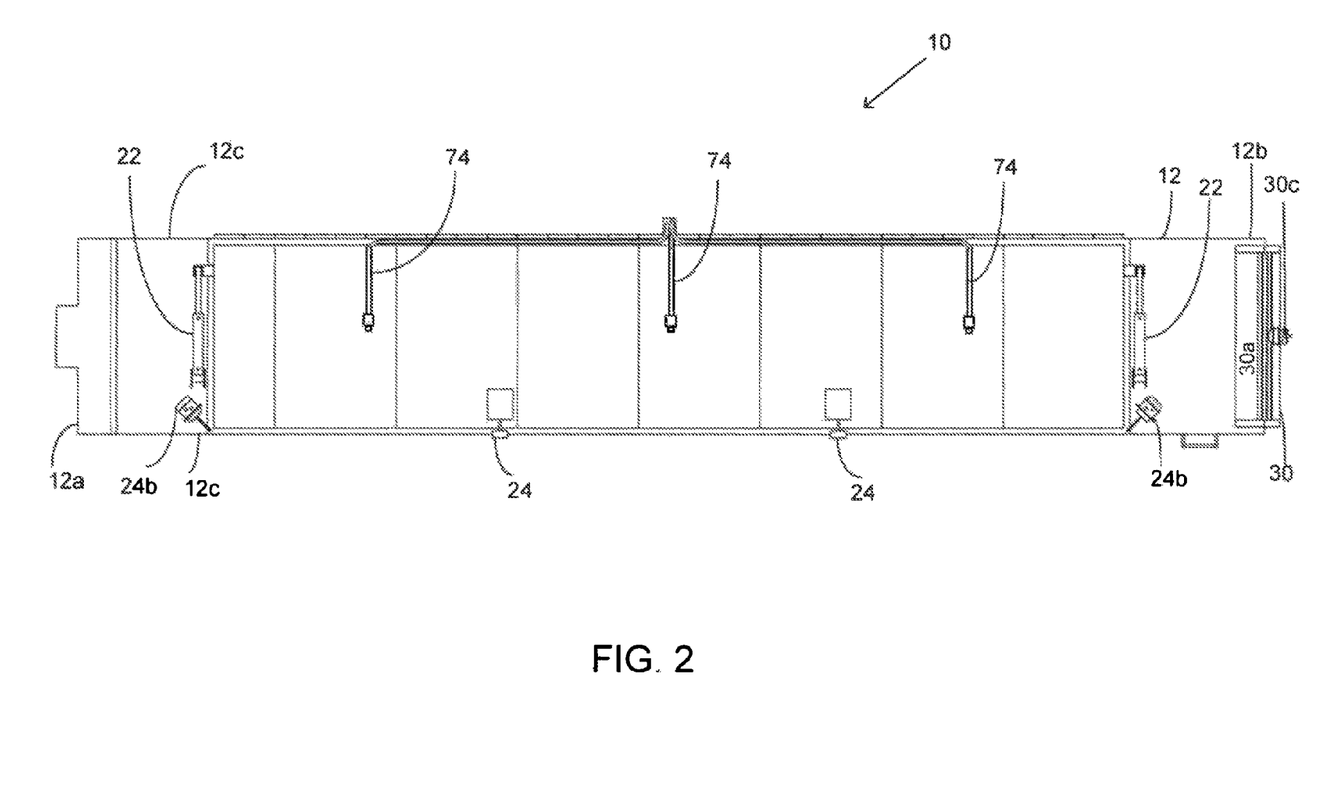
FIG. 2 is a top view of a transport trailer in accordance with one embodiment of the invention.
Figure 8:
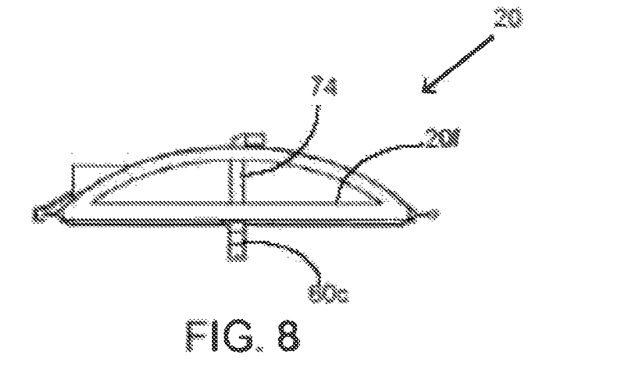
FIG. 8 is a section view of a transport trailer lid in a closed position in accordance with one embodiment of the invention.
Figure 9:
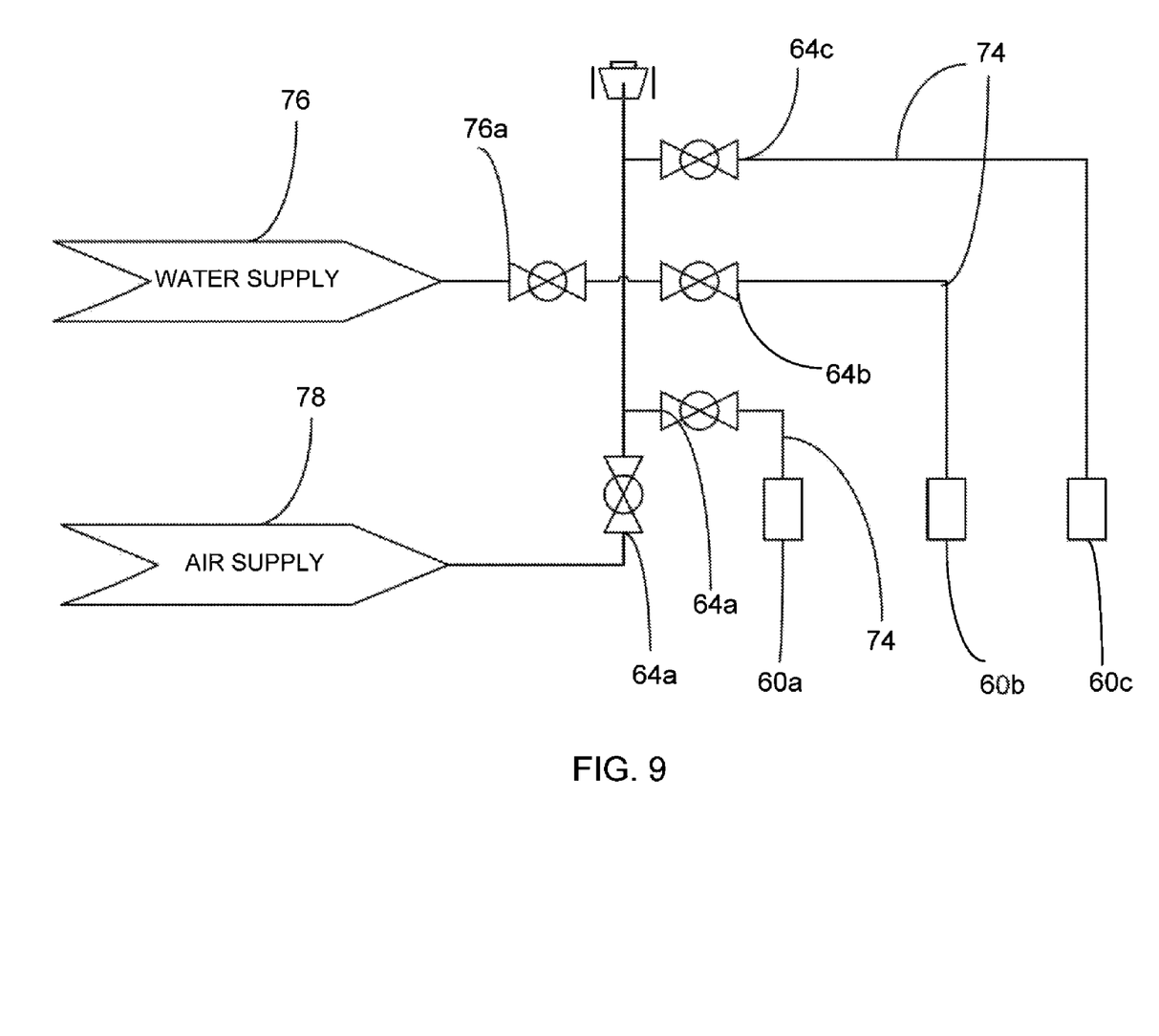
FIG. 9 is an engineering diagram illustrating a transport trailer jet system in accordance with one embodiment of the invention.
Figure 10:
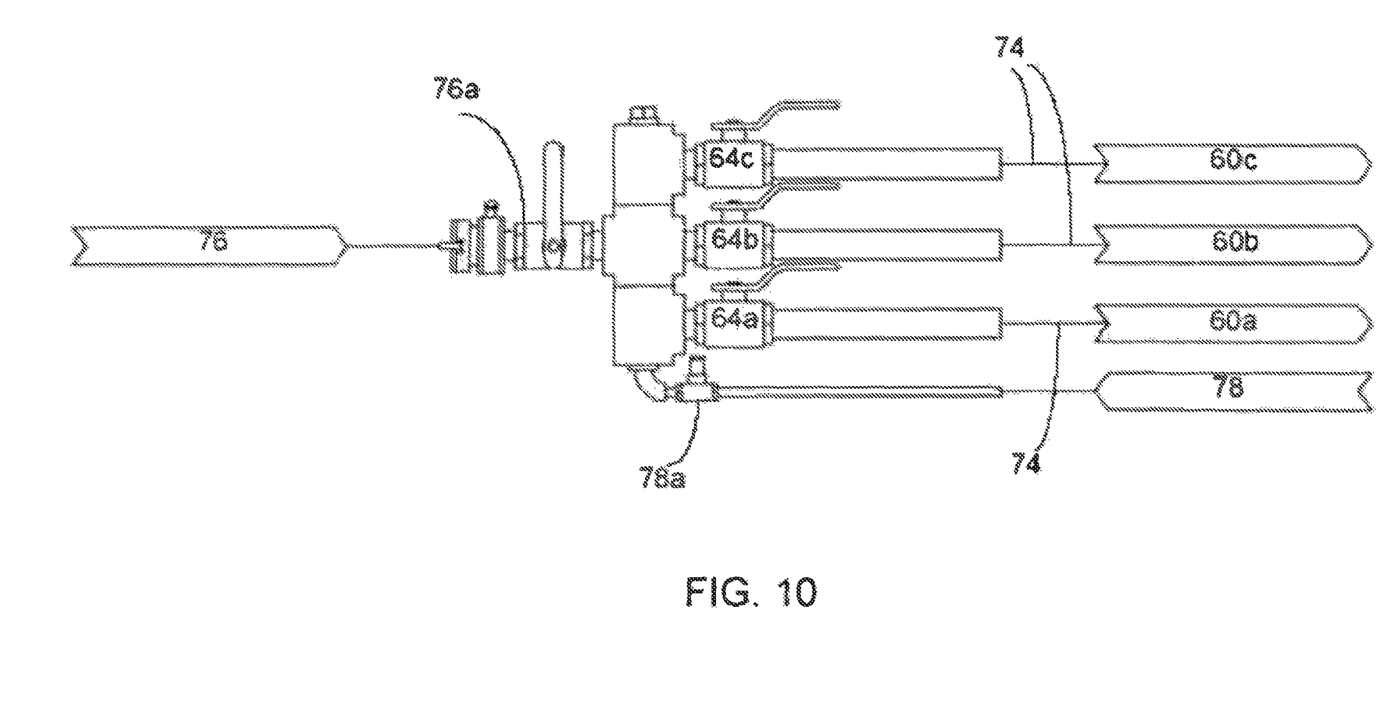
FIG. 10 is a diagram illustrating a transport trailer jet system in accordance with one embodiment of the invention.

The cleaning system is used for cleaning the container and generally comprises a front, middle, and rear jet 60*a*, 60*b*, 60*c* operatively connected from the top surface 20*a* of the lid through to the bottom surface 20*b* of the lid, as best shown in FIGS. 2, 5 and 8. The jets combine air and water under high pressure to create a concentrated stream of water for impacting an inside surface of the container to blast contaminants from the surface, scouring the interior surface of the container clean. Preferably the jets automatically rotate 360° when they are blasting a stream of water such that the entire interior surface is impacted by the jet stream. Referring to FIGS. 2 and 8-10, water and air are supplied to the jets through lines 74 that are connected to a water supply 76 and air supply 78 located on the outside of the container. Referring to FIGS. 9 and 10, there is a water valve 76*a* and an air valve 78*a* for controlling the flow, respectively, of water and air through the lines 74. Each jet 60*a*, 60*b*, 60*c* also has a corresponding valve 64*a*, 64*b*, 64*c* for controlling the flow of water and air to the jet. The valves may be automatically or manually turned on or off to control the operation of the jets.

Method of Operation

In operation, a material such as a slurry is loaded into the container that is operatively connected to a trailer bed attached to a truck. During loading, the lid is in an open position, the tailgate is closed and locked and the container is in a flat horizontal position. As the tailgate is closed, the baffles are automatically in the locked, vertical position creating compartments in the container. The material can be loaded into the compartments of the container through the top of the container using an auger, hose, loader, or the like. After loading, the lid is closed by activating the hydraulic ram, and locked and sealed in place. During loading, the material will be evenly distributed between the compartments although as noted above, some communication between compartments is possible.

The truck transports the trailer and container containing the load to another site. Importantly, during transport the baffles are locked in a vertical position, keeping the load contents compartmentalized and preventing them sloshing between the front and rear ends of the container and/or accumulating at one end of the container. If the external temperature is near or below freezing, the heater system may be turned on.

Upon arrival at the end site, the container is positioned for dumping the load out the rear end of the container. If in use, the heater system is turned off. The pressure release valve on the tailgate is opened to release any built up pressure inside the container. The front end of the container is moved upwardly to angle the container with the rear end below the front end. The tailgate is unlocked and opened, which simultaneously unlocks and, pivots the baffles into an open position, allowing the load contents from all the compartments to flow out the rear end of the container. After emptying the load, the jets may be turned on to clean out any debris left in the container from the load. After the jets have adequately cleaned the container, they are turned off and the tailgate is closed, thereby returning the baffles to their vertical position, and the front end of the container is pivoted down to return the container to a horizontal position. The truck and trailer are then ready to retrieve another load.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A transport container for use on a dump truck style tractor trailer comprising:
    a container having an interior surface, an open top and a pivotable tailgate located at a back end of the container that is operable between an open and closed position;
    at least one interior baffle pivotably connected to the interior surface of the container, the at least one interior baffle pivotable between a substantially vertical closed position and an angled open position, wherein in the angled open position a bottom end of the at least one interior baffle is pivoted towards the tailgate; and
    a rod pivotably connected to the at least one interior baffle and to the tailgate for pivoting the at least one interior baffle and the tailgate substantially simultaneously between the open and closed positions.

2. The transport container of claim 1 further comprising a lid pivotably connected to the open top of the container for covering and sealing the open top.

3. The transport container of claim 1 wherein there are at least two interior baffles, wherein the at least two interior baffles are connected to each other via a second rod for pivoting the at least two interior baffles substantially simultaneously.

4. The transport container of claim 1 further comprising a tailgate locking device for locking the tailgate in the closed position, wherein locking the tailgate simultaneously locks the at least one baffle in the substantially vertical closed position.

5. The transport container of claim 2 wherein the container is sealed when the tailgate is in the closed position.

6. The transport container of claim 1 further comprising a cleaning system for cleaning the interior surface of the container.

7. The transport container of claim 6 wherein the cleaning system comprises at least one jet operatively connected to the container.

8. The transport container of claim 1 further comprising a heating system for heating the container.

9. The transport container of claim 1 wherein when the at least one baffle is in the substantially vertical closed position there is a first void space between a bottom end of the baffle and a bottom floor of the container.

10. The transport container of claim 2 wherein the tailgate and the lid are hydraulically activated.

11. A transport container for use on a dump truck style tractor trailer comprising:
    a container having an interior surface, an open top and a pivotable tailgate located at a back end of the container that is operable between an open and closed position;
    at least two interior baffles, each pivotably connected to the interior surface of the container and pivotable between a substantially vertical closed position and an angled open position, wherein in the angled open position a bottom end of the baffle is pivoted towards the tailgate; and
    a lid pivotably connected to the open top of the container for covering and sealing the open top;
    wherein the at least two interior baffles and the tailgate are operably connected to each other via at least one rod for pivoting the at least two interior baffles and the tailgate substantially simultaneously between the open and closed positions.

12. The transport container of claim 11 wherein when the at least two interior baffles are in the substantially vertical closed position there is a void space between the bottom ends of the baffles and a bottom floor of the container.

13. The transport container of claim 11 further comprising at least one jet operatively connected to the container for cleaning the interior of the container.

\* \* \* \* \*